US012691833B2

(12) United States Patent
Bozeman

(10) Patent No.: US 12,691,833 B2
(45) Date of Patent: Jul. 28, 2026

(54) REMOVABLE EQUIPMENT MOUNT FOR A VEHICLE

(71) Applicant: The United States of America, as represented by the Secretary of the Navy, San Diego, CA (US)

(72) Inventor: Eric G Bozeman, La Mesa, CA (US)

(73) Assignee: United States of America, as represented by the Secretary of the Navy, Washington, DC (US)

(*) Notice: Subject to any disclaimer, the term of this patent is extended or adjusted under 35 U.S.C. 154(b) by 349 days.

(21) Appl. No.: 18/422,720

(22) Filed: Jan. 25, 2024

(65) Prior Publication Data

US 2025/0242761 A1     Jul. 31, 2025

(51) Int. Cl.
    *B60R 11/02*        (2006.01)
    *B60R 5/00*         (2006.01)
    (Continued)

(52) U.S. Cl.
    CPC .............. *B60R 11/02* (2013.01); *B60R 5/003* (2013.01); *B60R 7/08* (2013.01);
    (Continued)

(58) Field of Classification Search
    CPC .......... B60R 11/02; B60R 5/003; B60R 7/08; B60R 2011/0029; B60R 2011/0059; B60R 2011/0066
    See application file for complete search history.

(56) References Cited

U.S. PATENT DOCUMENTS 1,583,623 A * 5/1926 Stern ...................... B60P 1/003
                                                224/549
1,689,417 A * 10/1928 Yells ..................... A61G 21/00
                                                224/549
(Continued)

FOREIGN PATENT DOCUMENTS

CN      102085786 A * 6/2011 ........... B62K 25/286
CN      107735221 A * 2/2018 .............. B25B 5/16
(Continued)

OTHER PUBLICATIONS

Bozeman, Eric et al. (Naval Information Warfare Center Pacific, San Diego, CA), Drift Improvement with Reinforcement Training—Inertial Sensors—Year 1, Accession No. AD1161696, Report Date: Feb. 1, 2022, Available from Defense Technical Information Center (DTIC).

(Continued)

*Primary Examiner* — Stephanie E Bloss
*Assistant Examiner* — Kevin C Butler
(74) *Attorney, Agent, or Firm* — Naval Information Warfare Center, Pacific; Kyle Eppele; Andrew J. Cameron

(57) ABSTRACT

A removable equipment mount for a vehicle includes a frame and a mounting plate. The frame is to be disposed on a floor of the vehicle and includes a cross-member and a toggle clamp. The cross-member is configured to extend along a width of an interior of the vehicle. The toggle clamp is coupled to the main cross-member and includes a main draw arm that is positioned to engage with a first seat striker of the vehicle to selectively secure the frame to the floor. The mounting plate is coupled to the frame and includes one or more mounting features configured to secure an electronic equipment module to the mounting plate.

18 Claims, 11 Drawing Sheets

(51) Int. Cl.
    *B60R 7/08*         (2006.01)
    *B60R 11/00*       (2006.01)

(52) U.S. Cl.
    CPC ................. *B60R 2011/0029* (2013.01); *B60R 2011/0059* (2013.01); *B60R 2011/0066* (2013.01)

(56) References Cited

U.S. PATENT DOCUMENTS

| | | | | |
|---|---|---|---|---|
| 3,347,542 A * | 10/1967 | Mericle, Jr. ............. | B25B 5/122 269/228 |
| 4,420,238 A * | 12/1983 | Felix ...................... | F16M 11/18 348/151 |
| 4,789,126 A * | 12/1988 | Rice ................... | B60N 2/01566 297/15 |
| 5,165,148 A * | 11/1992 | Fleischer ................. | B25B 5/12 292/113 |
| 5,427,436 A * | 6/1995 | Lloyd ................. | A61G 13/121 297/409 |
| 5,439,152 A * | 8/1995 | Campbell ................. | B60R 9/00 211/195 |
| 5,833,101 A * | 11/1998 | Watkins .................. | B60R 11/04 396/419 |
| 6,308,873 B1 * | 10/2001 | Baldas ...................... | B60R 7/02 217/15 |
| 6,502,731 B1 * | 1/2003 | Gehring ................... | B60R 7/08 D6/567 |
| 6,896,457 B2 * | 5/2005 | Halliar ................... | B60P 7/135 410/47 |
| 6,918,734 B2 * | 7/2005 | Nick ...................... | B60P 1/003 414/629 |
| 7,401,716 B2 * | 7/2008 | Svenson ................. | B60R 5/045 224/42.32 |
| 7,621,575 B1 * | 11/2009 | Kellerman ............. | A61G 21/00 296/18 |
| 8,235,269 B2 * | 8/2012 | Rupar ....................... | B60R 5/04 224/539 |
| 8,678,473 B2 * | 3/2014 | Dayton ................ | B62D 35/001 296/180.4 |
| 8,905,276 B2 * | 12/2014 | Bernert ..................... | B60R 7/02 224/547 |
| 9,511,705 B1 * | 12/2016 | Egigian ................. | B60P 7/0807 |
| 10,675,992 B2 * | 6/2020 | Nishiguchi .......... | B62D 47/003 |
| 11,414,005 B2 * | 8/2022 | Egigian ................. | B60P 7/0807 |
| 2001/0054632 A1 * | 12/2001 | Larsen ...................... | B60R 5/00 224/544 |
| 2007/0080555 A1 * | 4/2007 | Lutzka ............... | B60N 2/01583 296/65.03 |
| 2008/0054145 A1 * | 3/2008 | Lipman ............... | B60R 11/0252 248/242 |
| 2009/0212584 A1 * | 8/2009 | Hill ........................... | B60R 7/02 296/37.5 |
| 2010/0148414 A1 * | 6/2010 | Poole ........................ | B25B 5/04 269/254 R |
| 2011/0147425 A1 * | 6/2011 | Di Miceli .............. | B60R 11/00 224/547 |
| 2013/0291362 A1 * | 11/2013 | Sutton ................... | B60R 9/0485 29/428 |
| 2014/0263891 A1 * | 9/2014 | Landskron ............ | B60N 2/067 248/205.1 |
| 2016/0031382 A1 * | 2/2016 | Chinn ................... | A61B 90/50 29/428 |
| 2017/0203412 A1 * | 7/2017 | Grobbel ................... | B25B 5/06 |
| 2019/0250485 A1 * | 8/2019 | Richins ............... | F16M 11/041 |
| 2020/0262330 A1 * | 8/2020 | Smith ................ | A47L 11/4016 |
| 2022/0194301 A1 * | 6/2022 | Griffith ................. | B60R 9/00 |
| 2024/0051453 A1 * | 2/2024 | Haycock .................. | B60P 7/13 |
| 2025/0242761 A1 * | 7/2025 | Bozeman ............... | B60R 11/02 |

FOREIGN PATENT DOCUMENTS

| | | | | | |
|---|---|---|---|---|---|
| CN | 207142556 U | * | 3/2018 | | |
| CN | 114906059 A | * | 8/2022 | ............... | B60R 9/10 |
| CN | 223583133 U | * | 11/2025 | | |
| DE | 102004049224 A1 | * | 4/2006 | ............... | B60P 1/52 |
| DE | 102023002125 A1 | * | 5/2024 | ............... | B60R 7/04 |
| EP | 3195980 A1 | * | 7/2017 | ............... | B25B 5/12 |
| KR | 20230028853 A | * | 3/2023 | ........... | B62D 21/157 |

OTHER PUBLICATIONS

Bozeman, Eric et al. (Naval Information Warfare Center Pacific), Drift Improvement with Reinforcement Training. Inertial Sensors—Year 2, Accession No. AD1185841, Report Date: Nov. 1, 2022, Available from Defense Technical Information Center (DTIC).

* cited by examiner

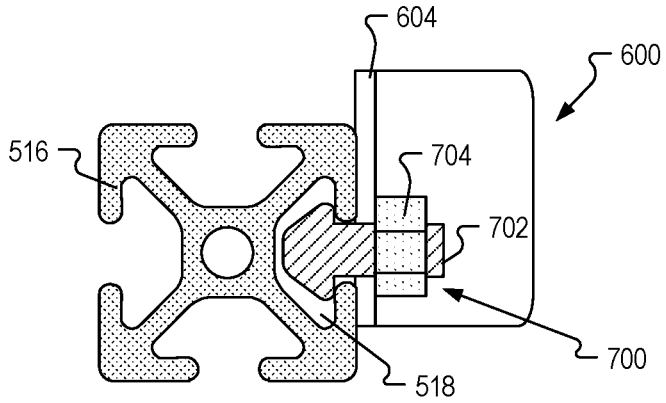
FIG. 7
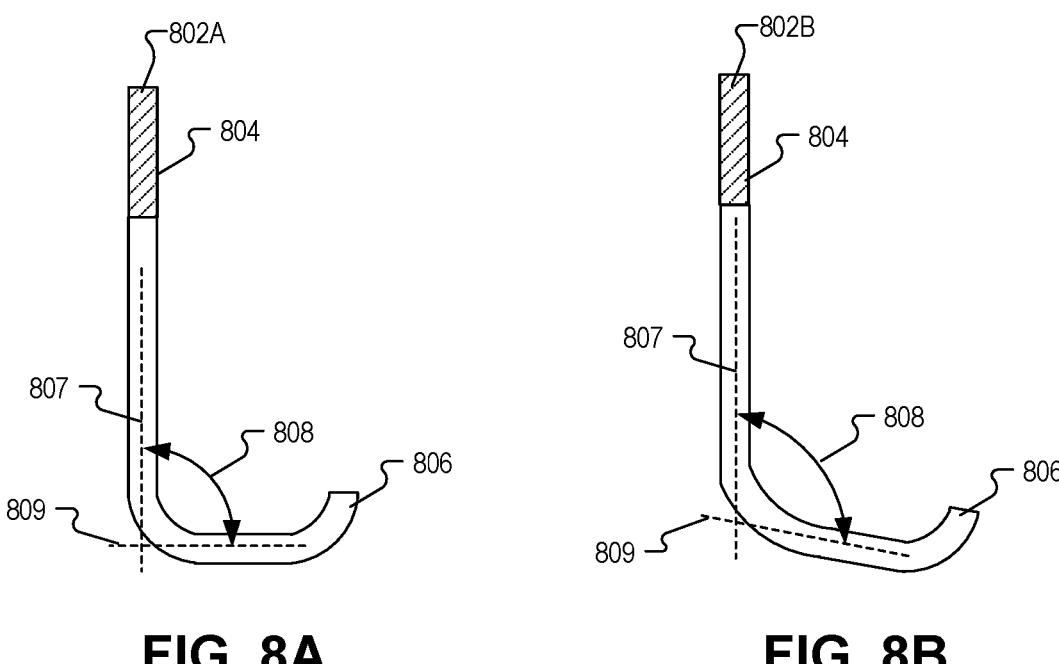
FIG. 8A                    FIG. 8B

REMOVABLE EQUIPMENT MOUNT FOR A VEHICLE

FEDERALLY-SPONSORED RESEARCH AND DEVELOPMENT

The United States Government has ownership rights in one or more inventions provided in this disclosure. Licensing inquiries may be directed to Office of Research and Technical Applications, Naval Information Warfare Center Pacific, Code 72110, San Diego, CA, 92152; (619) 553-5118; ssc_pac_t2@navy.mil. Reference Navy Case No. 210530.

TECHNICAL FIELD

Aspects of the present disclosure relate generally to electronic equipment mounts, and in particular but not exclusively, relate to removable electronic equipment mounts for vehicles.

BACKGROUND OF THE INVENTION

In some contexts, a vehicle may be utilized to carry equipment for experimentation, testing, calibration, and/or for data collection while the vehicle is in motion. The equipment may include electronic equipment, such as various sensors, computers, power supplies, cabling, user input devices, or other components. In addition, the operation of some equipment may be particularly sensitive to shifting or movements due to the motion of the vehicle. Even still, for proper operation and/or data validity, some equipment may need to maintain its position and orientation within the vehicle to ensure proper operation and/or data validity. By way of example, the electronic equipment may be part of an inertial navigation system (INS) that includes one or more accelerometers and/or gyroscopes. Designing, researching, and testing of various aspects of the INS system may include placing the INS system inside the vehicle and then collecting data (e.g., position, orientation, velocity, etc.) from the various sensors while the vehicle is in motion. In some instances, the accuracy of the data collected by the INS system depends on the system maintaining its physical position relative to the vehicle and/or relative to other components of the system itself.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 7 illustrates an example implementation of attaching a toggle clamp to a frame, in accordance with aspects of the disclosure.

FIGS. 8A and 8B illustrate example draw arms, in accordance with aspects of the disclosure.

DETAILED DESCRIPTION

Figure 1:
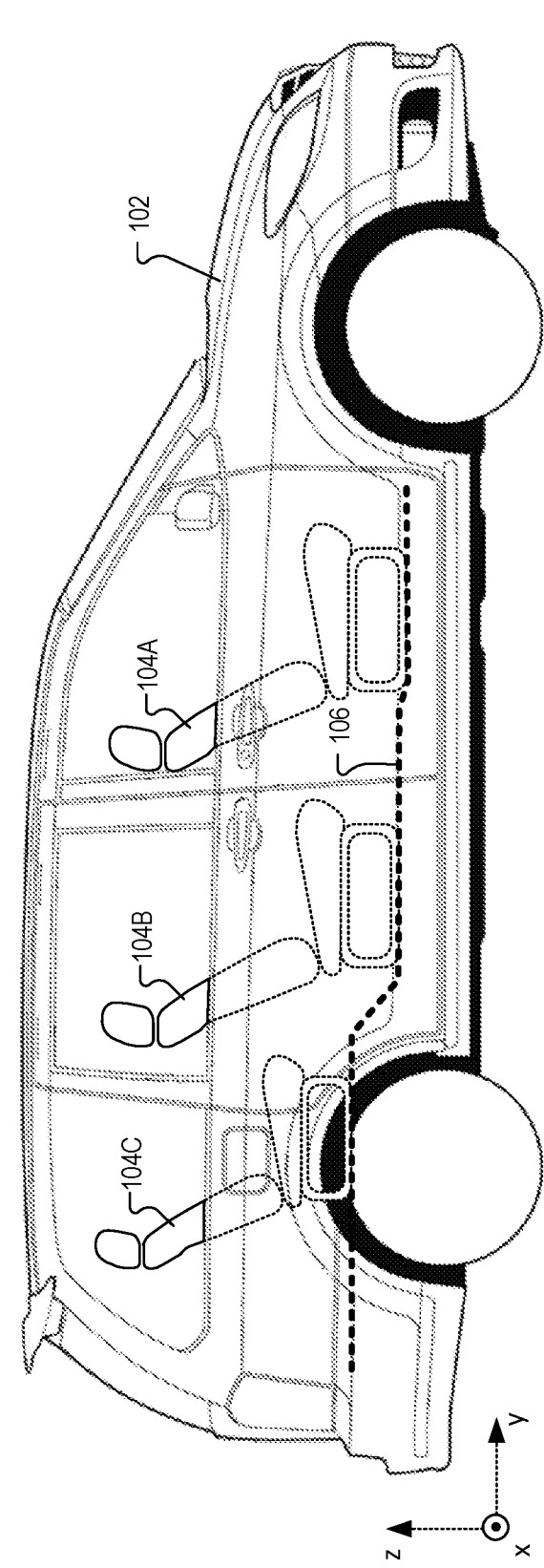
FIG. 1 illustrates a vehicle equipment platform, in accordance with aspects of the disclosure.

Embodiments of a removable equipment mount, a removable equipment system, and a vehicle equipment platform are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As mentioned above, a vehicle may be utilized to carry electronic equipment for experimentation, testing, calibration, and/or for data collection while the vehicle is in motion. However, in some situations the vehicle is shared among other users and/or utilized for other purposes. Thus, the electronic equipment may need to be removed and then re-installed each and every time the equipment is to be used with the vehicle. Repeated removal and re-installation of the electronic equipment may be costly and time-consuming, especially when an electronic equipment module, such as an inertial navigation system (INS) has particular installation requirements (e.g., position, orientation, etc.). Furthermore, the electronic equipment may include separate and distinct modules that each need to be re-installed, configured, positioned, and connected together for proper operation. Even still, because the vehicle may be shared, the installation of the electronic equipment should preferably be non-destructive and non-permanent.

Accordingly, aspects of the present disclosure provide a removable equipment mount for a vehicle that addresses one or more of the above-noted issues. For example, in one aspect, the equipment mount includes a frame that is to be disposed on and secured to the floor of the vehicle by way of one or more toggle clamps. The use of toggle clamps may allow the quick, easy, and non-destructive installation and removal of the equipment mount without the need for additional tools. In another aspect, the frame may be configured to provide a consistent and repeatable positioning and/or orientation of the electronic equipment each time the equipment mount is installed. In yet another aspect, the equipment mount includes a mounting plate coupled to the frame. The mounting plate may include one or more mounting features (e.g., through-holes) that allow one or more electronic equipment modules to be secured thereto. Thus, the positioning, orientation, and interconnections between one or more equipment modules may be maintained allowing the equipment mount and electronic equipment to be installed in and removed from the vehicle as one single coherent unit. These and other aspects will be discussed in more detail below.

FIG. 1 illustrates a vehicle equipment platform 100, in accordance with aspects of the disclosure. Vehicle equipment platform 100 is shown as including a vehicle 102 and passenger seats 104A-104C.

Vehicle 102 may include second and/or third row seating for additional passengers. The seats 104B of the second row and the seats 104C of the third row may be movable from a seating position to a stowed position within the floor 106 of vehicle 102 or may even be removed to be stored separate from and outside of vehicle 102. Removal or movement of seats 104B and 104C to the stowed position and may expose a larger area of the interior of vehicle 102 for various cargo-carrying needs, such as carrying one or more electronic equipment modules, as discussed herein. Although FIG. 1 illustrates vehicle 102 as a minivan, vehicle 102 may be a sport utility vehicle, a bus, a cargo van, or any other vehicle that includes passenger seats that are removable or stowable as mentioned above.

Figure 2:
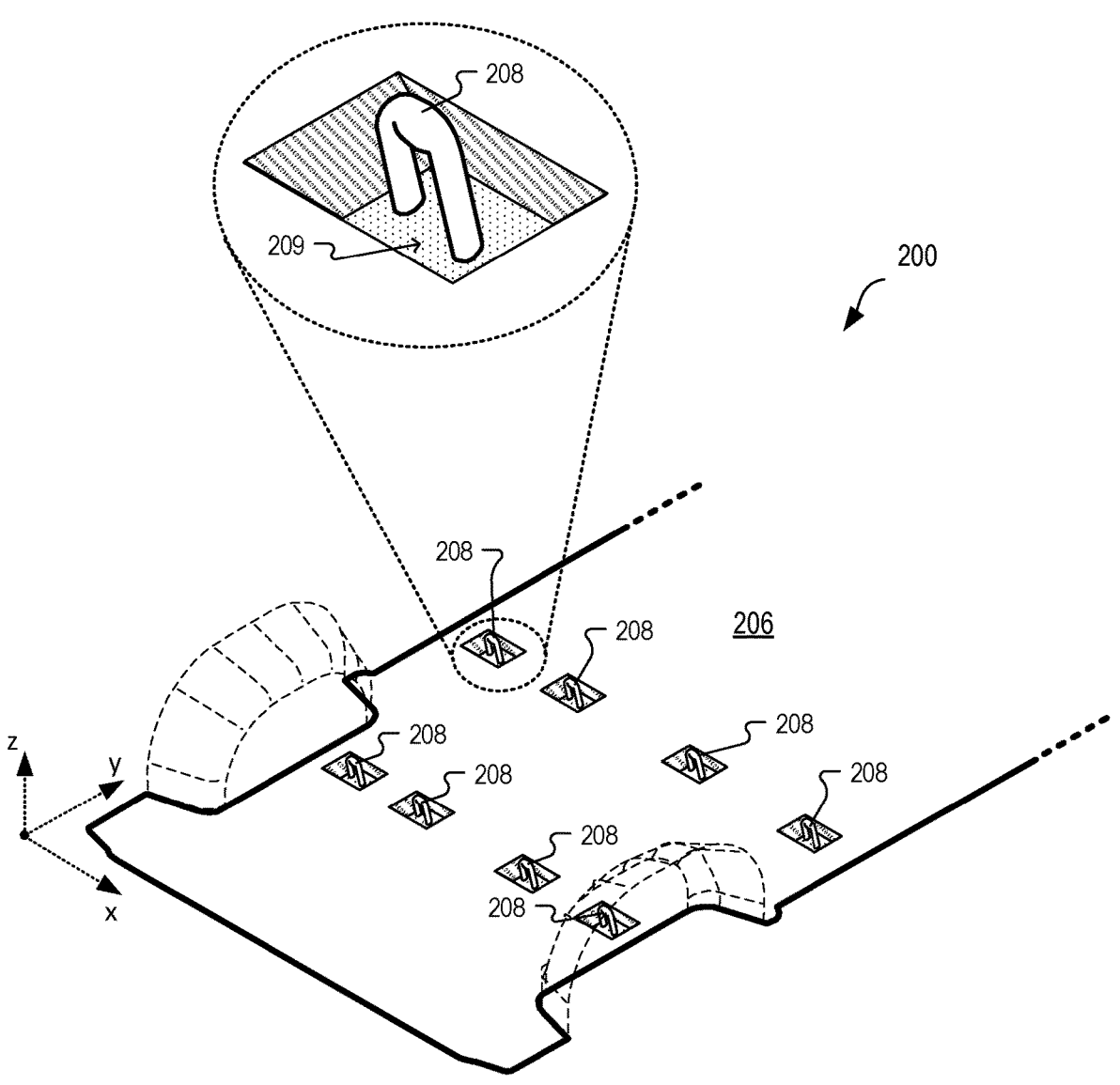
FIG. 2 illustrates a floor of a vehicle having seat strikers, in accordance with aspects of the disclosure.

FIG. 2 illustrates an interior 200 of a vehicle with one or more passenger seats removed. Interior 200 is one possible implementation of an interior of vehicle 102 of FIG. 1, where floor 206 is one possible example of floor 106.

As shown in FIG. 2, the floor 206 may include several seat strikers 208. The passenger seats (e.g., seats 104B and/or 104C of FIG. 1) may include one or more latching mechanisms that are configured to mate with a corresponding one or more of the seat strikers 208 of the vehicle. The seat strikers 208 may be integrated with or attached to the frame or body of the vehicle, thereby providing a strong and rigid anchor with which to secure the passenger seats when in the seats are in the seating position. In some aspects, each seat striker 208 is disposed in a corresponding recess 209 in the floor 206. Thus, the seat strikers 208 may be fully recessed below a surface of the floor 206, partially recessed below the surface of floor 206, or fully proud (i.e., above) the surface of floor 206 depending on the design of the vehicle. Disengaging the latching mechanisms of the passenger seats from the seat strikers 208 allows the removal or movement of the passenger seats to the stowed position and may expose a larger area of the vehicle interior 200 for installation of one or more electronic equipment modules.

In some scenarios, tie-down straps (e.g., bungee cords, ratchet straps, etc.) may be hooked into the seat strikers 208 in an attempt to secure an electronic equipment module to the floor 206 of the vehicle. However, the use of tie-down straps often does not fully secure the electronic equipment module. Attempting to utilize such tie-down straps may result in equipment that still shifts or moves while driving, or between evolutions. Furthermore, the tie-down straps may interfere or obstruct access to the electronic equipment module as the straps may need to be placed on or around the electronic equipment module itself. Even still, the straps may not adequately secure smaller electronic equipment modules and often provide inconsistent positioning/orientation of the electronic equipment modules within the interior 200.

Figure 3:
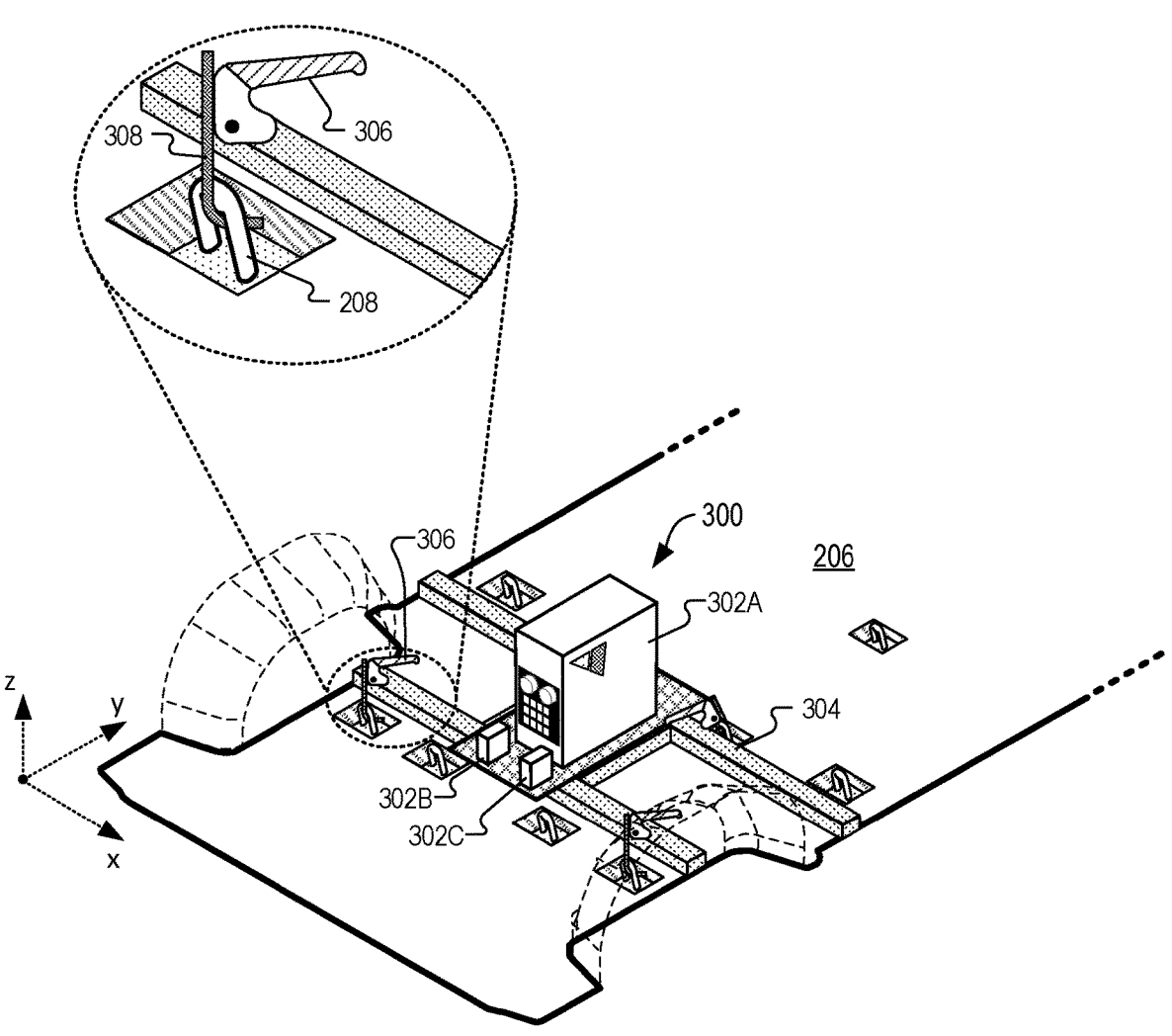
FIG. 3 illustrates a removable equipment system, in accordance with aspects of the disclosure.

FIG. 3 illustrates a removable equipment system 300, in accordance with aspects of the disclosure. Removable equipment system 300 is shown as including electronic equipment modules 302A-302C and removable equipment mount 304. Removable equipment mount 304 is shown as including at least one toggle clamp 306.

As shown in FIG. 3, electronic equipment modules 302A-302C are mounted and secured to the removable equipment mount 304 such that the entire removable equipment system 300 (i.e., electronic equipment modules 302A-302C and removable equipment mount 304) may be installed and removed from the vehicle, together, as one single coherent unit. Although FIG. 3 illustrates removable equipment system 300 as including three electronic equipment modules 302A-302C, any number of electronic equipment modules, including one or more, may be incorporated. The electronic equipment modules 302A-302C may include various sensors, computers, power supplies, cabling, user input devices, or other components. In one aspect, one or more of the electronic equipment modules 302A-302C may be part of an inertial navigation system (INS) that includes one or more accelerometers and/or gyroscopes.

FIG. 3 further illustrates removable equipment system 300 as being secured to the floor by way of one or more toggle clamps 306. As shown in the expanded view of FIG. 3, toggle clamp 306 includes a draw arm 308 that is positioned to engage with a corresponding seat striker 208 to selectively secure the removable equipment system 300 to the floor 206. Toggle clamps 306 are configured to be engaged and disengaged by hand to tension the draw arm 308 against the seat striker 208, thus enabling the quick and easy installation and the similarly quick and easy removal of the equipment system 300 into and out of the vehicle.

Figure 4:
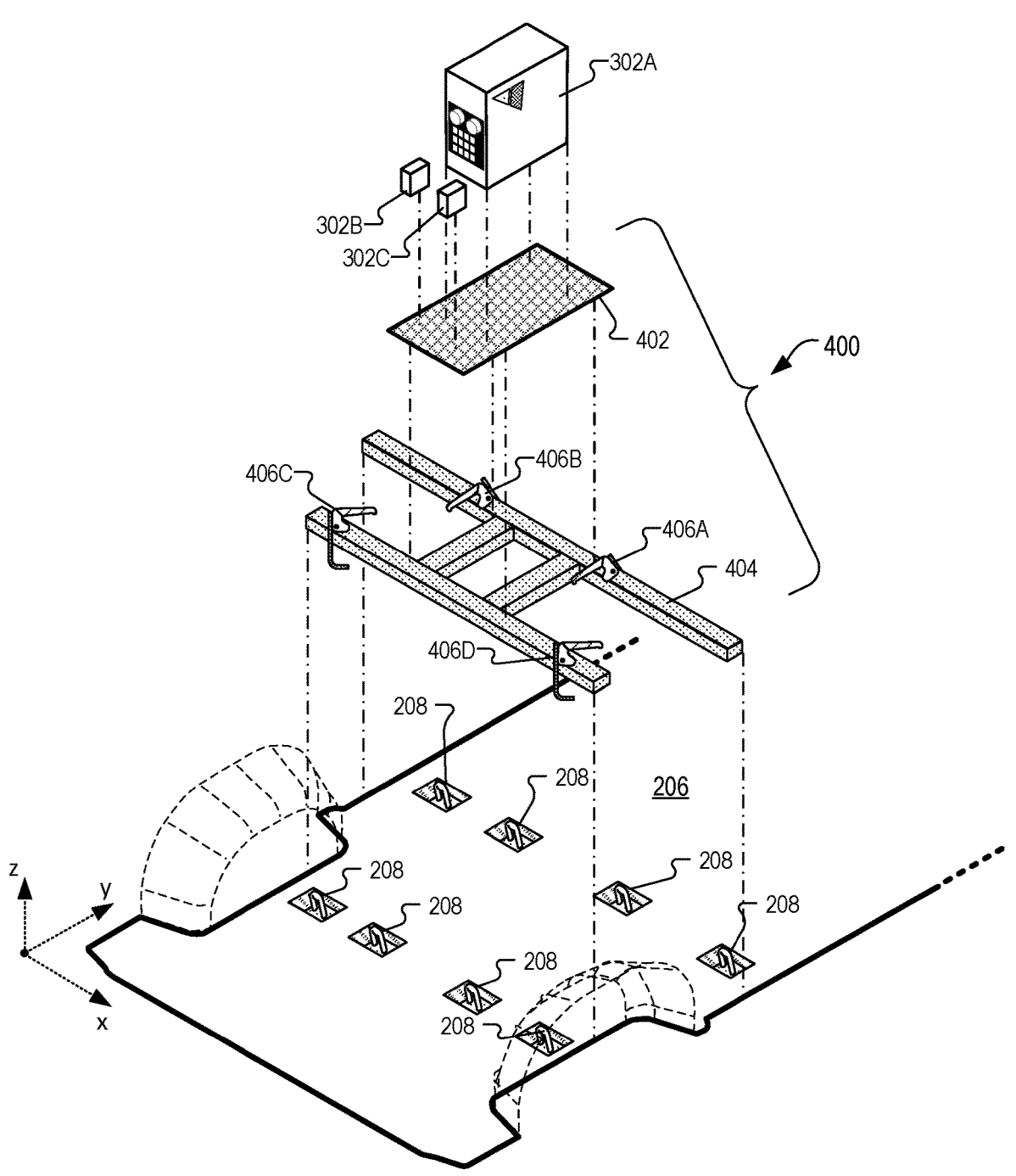
FIG. 4 illustrates a removable equipment mount, in accordance with aspects of the disclosure.

FIG. 4 illustrates an exploded view of a removable equipment mount 400, in accordance with aspects of the disclosure. Removable equipment mount 400 is one possible implementation of removable equipment mount 304 of FIG. 3. Removable equipment mount 400 is shown as including a mounting plate 402 and a frame 404. Frame 404 is illustrated as including toggle clamps 406A-406D. As shown in FIG. 4, frame 404 is configured to be disposed on the floor 206 of the vehicle and mounting plate 402 is coupled to the frame 404. In some examples, mounting plate 402 is fixedly attached to the frame 404 such that both may be moved together as a single unit. Although FIG. 4 illustrates removable equipment mount 400 as including one mounting plate 402 coupled to the frame 404, removable equipment mount 400 may include any number of mounting plates coupled to the frame 404, including one or more.

In some aspects, frame 404 is configured to provide alignment between the toggle clamps 406A-406D and a respective one of the seat strikers 208. That is, frame 404 may provide both side-to-side alignment (e.g., along the x-axis as shown in FIG. 4) and front-to-back alignment (e.g., along the y-axis as shown in FIG. 4) for proper engagement of a toggle clamp's draw arm with a corresponding seat striker 208. In another aspect, frame 404 is configured to reduce or prevent lateral movements of the removable equipment mount 400. For example, frame 404 may extend side-to-side (e.g., along the x-axis) to contact one or more interior side walls of the vehicle to prevent shifting of the removable equipment mount 400. Even still, having frame 404 extend side-to-side to contact one or more interior side walls may provide consistent positioning and orientation of the electronic equipment modules 302A-302C with respect to the vehicle. However, depending on the design of the vehicle's interior, in some instances, having the frame 404 extend side-to-side to contact the interior side walls may make installation and/or removal awkward or difficult. Thus, as will be discussed in more detail below with reference to FIG. 9C, in some examples, the toggle clamps 406A-406D may be positioned and configured to provide lateral forces to secure frame 404 from lateral movements within the vehicle.

Figure 5A:
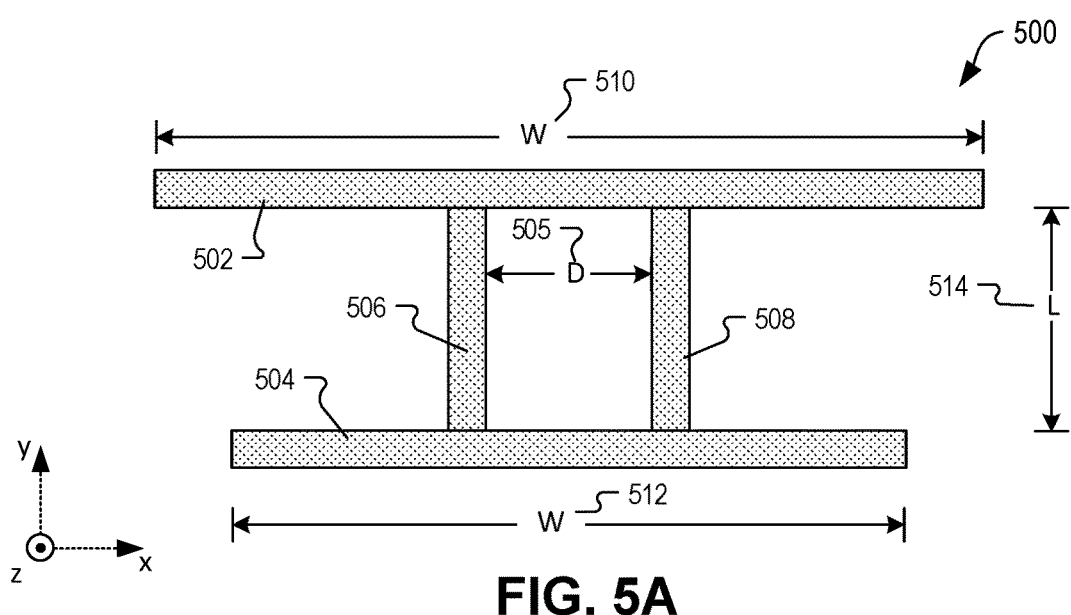
FIG. 5A illustrates a frame of a removable equipment mount, in accordance with aspects of the disclosure.
Figure 5B:
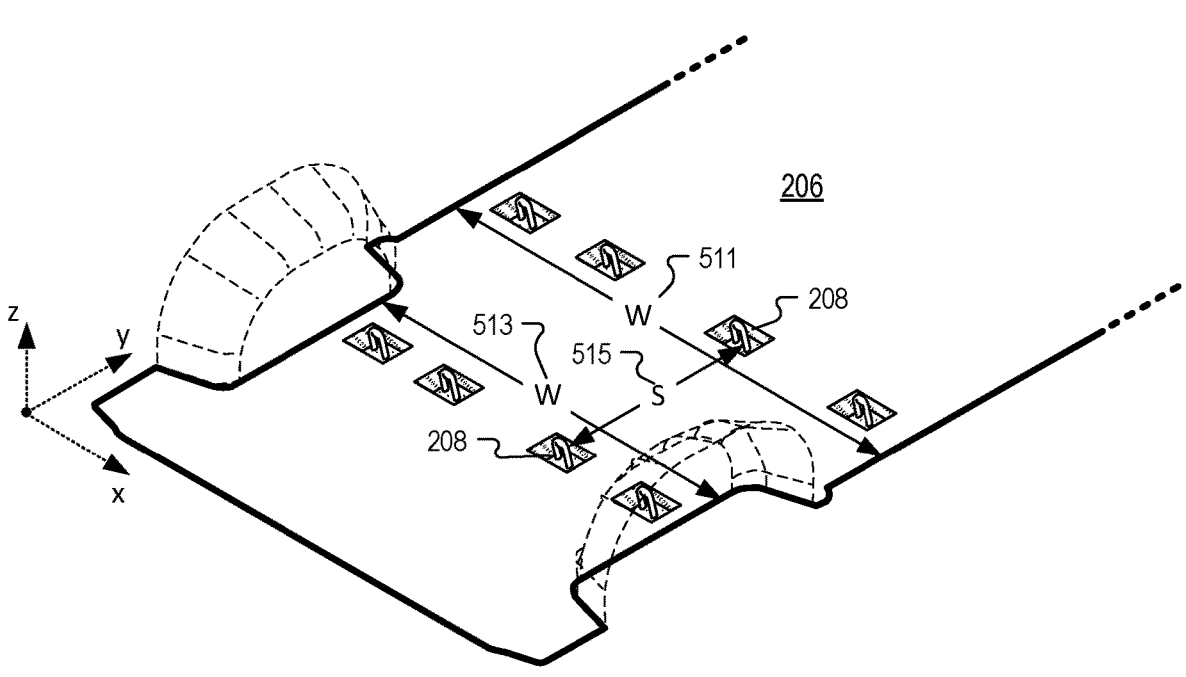
FIG. 5B illustrates various dimensions of an interior of a vehicle, in accordance with aspects of the disclosure.

FIG. 5A illustrates a frame 500 of a removable equipment mount, in accordance with aspects of the disclosure. Frame 500 is one possible implementation of frame 404 of FIG. 4. Frame 500 is shown as including a cross-member 502, a cross-member 504, a spacer 506 and a spacer 508. Although FIG. 5A illustrates frame 500 as including two cross-members and two spacers, frame 500 may include any number of cross-members and spacers, including one or more. FIG. 5B illustrates various dimensions of an interior of a vehicle, in accordance with aspects of the disclosure. Frame 500 will be described with reference to both FIGS. 5A and 5B.

In one aspect, cross-members 502 and 504 are configured to extend along a width of the vehicle. That is, cross-members 502 and 504 are configured to be placed in a direction that is the same as an interior side-to-side width. For example, cross-member 502 may extend along a width W 511 and cross-member 504 may extend along a width W 513 in an interior of the vehicle. In some aspects, cross-member 502 and/or cross-member 504 have a width that is substantially the same as the width of the interior of the vehicle to reduce lateral movements of the frame 500 while the frame 500 is disposed on the floor 206 of the vehicle. For example, cross-member 502 is illustrated as having a width W 510 that is substantially the same as width W 511 of the interior of the vehicle. In one example, width W 510 is approximately 48 inches. Similarly, cross-member 504 is illustrating as having a width W 512 that is substantially the same as the width W 513.

Some vehicles may have a varying width on the interior of the vehicle due to various designs and/or interior features. By way of example, FIG. 5B illustrates the interior of a vehicle having the width W 511 that is different from the width W 513. Thus, in some implementations, cross-member 502 has a width W 510 that is different from the width W 512 of cross-member 504 to conform the frame 500 to the varying widths of the vehicle interior.

FIG. 5A illustrates width W 510 as being larger than width W 512. However, in other examples, width W 510 may be equal to width W 512, or width W 510 may be smaller than width W 512, depending on the design of the interior of the vehicle. In one example, both width W 510 and width W 512 are approximately 48 inches. In some aspects, cross-member 502 and/or cross-member 504 may include end caps (e.g., rubber, plastic, fabric, etc.) to help protect the interior sidewalls of the vehicle from scratches or other damage. In addition, such end caps may enable the frame 500 to be press-fit snugly between the interior sidewalls of the vehicle further securing the frame 500. In yet another example, width W 510 and width W 512 are shorter than the corresponding widths on the interior of the vehicle to allow frame 500 to be easily installed and/or removed from the vehicle. For instance, width W 510 may be less than width W 511 and width W 512 may be less than width W 513.

As shown in FIG. 5A, frame 500 further includes spacers 506 and 508, each coupled to both cross-member 502 and to cross-member 504. In one aspect, spacer 506 and spacer 508 are configured to space the cross-member 502 apart from the cross-member 504. In some aspects, spacers 506 and 508 are configured to extend in a front-to-back direction of the vehicle (e.g., along the y-axis as shown in FIGS. 5A and 5B). As further shown in FIG. 5A, spacers 506 and 508 have a length L 514. In one aspect, length L 514 corresponds to a spacing S 515 between seat strikers 208. For example, as shown in FIG. 5B, seat strikers 208 may be spaced apart in a front-to-back direction (e.g., along the y-axis) by a distance S 515. Accordingly, the spacers 506 and 508 may have a length L 514 to align the toggle clamps and draw arms (e.g., see toggle clamp 306 and draw arm 308 of FIG. 3) that are mounted to the cross-members 502/504 with respective seat strikers 208 along the y-axis. For example, spacer 506 may have a length L 514 such that the distance between a toggle clamp mounted on cross-member 502 and the a toggle clamp mounted on cross-member 504 is the same as the spacing distance S 515 between seat strikers 208. In one aspect, length L 514 is less than 13 inches, and in particular may be approximately 12.91 inches.

As shown in FIG. 5A, spacer 506 may be disposed a distance D 505 from adjacent spacer 508. In some aspects, distance D 505 is configured to provide adequate structural support depending in part on the weight of the electronic equipment modules (e.g., electronic equipment modules 302A-302C) that are to be mounted. In addition, the distance D 505 may also be configured so as not to interfere with a bolt pattern of one or more of the electronic equipment modules. In one example, distance D 505 is approximately 16 inches, and in particular may be approximately 16.42 inches.

Figure 5C:
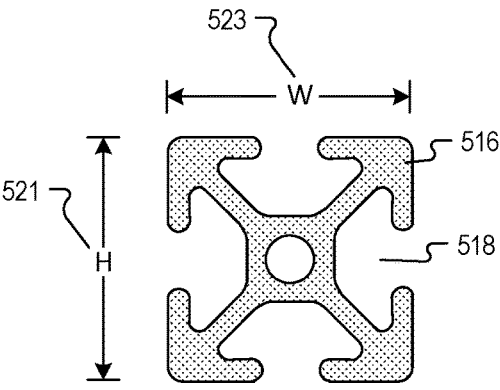
FIGS. 5C-5E illustrate various implementations of a frame with structural framing material, in accordance with aspects of the disclosure.
Figure 5D:
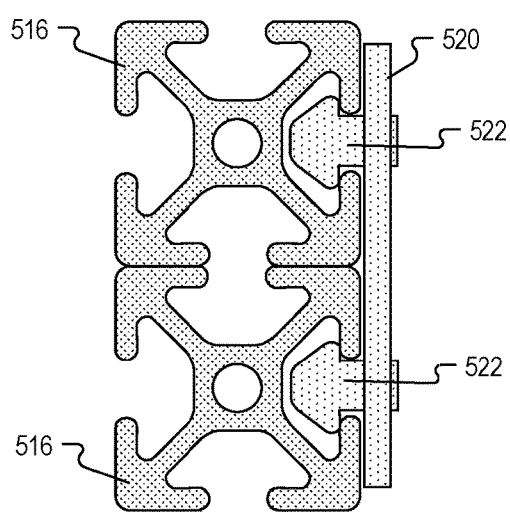
Figure 5E:
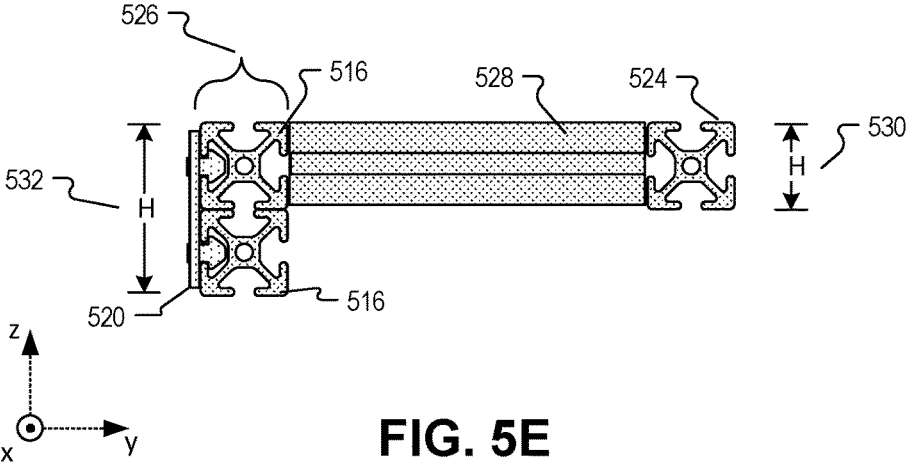

In some aspects, frame 500 is modular, where one or more components of frame 500 are interchangeable to account for variances in interior dimensions between different vehicles. For example, cross-member 502 may be removed and replaced with another cross-member having a different width W 510. Similarly, spacers 506/508 may be replaced with other spacers having a different length L 514 to account for differing spacing distances S 515 that may also occur from vehicle to vehicle. Thus, in some examples, one or more of the components of frame 500 may include structural framing material that allows for easy and quick assembly and disassembly of one or more features. By way of example, FIGS. 5C-5E illustrate various implementations of a frame with structural framing material 516, in accordance with aspects of the disclosure. FIG. 5C illustrates a cross-section of a structural framing material 516 that may be utilized as cross-member 502, cross-member 504, spacer 506, and/or spacer 508. In some aspects, structural framing material 516 includes one or more channels that allow interconnectivity and/or allows the attachment of one or more other components (e.g., toggle clamp). Structural framing material 516 may be part of a framing system that includes lengths of square or rectangular rigid material, such as extruded aluminum or plastic that includes a channel (e.g., t-slot, v-slot, etc.) down the centerline of one or more sides. In the illustrated example of FIG. 5C, structural framing material 516 includes a t-slot channel 518. In addition, the illustrated example shows structural framing material 516 as square having a height H 521 that is equal to its width W 523. In one example, height H 521 and width W 523 are each one inch. Referring to FIG. 5A, when implemented with structural framing material 516, cross-member 502 may include t-slot channel 518 that extends along the width W 510, cross-member 504 may include t-slot channel 518 that extends the width W 512, and spacers 506 and 508 may each include t-slot channel 518 that extends the length L 514.

In some examples, one or more of the components of frame 500 may be connected to one another using a fastener designed to be utilized with the particular structural framing material. For example, when implemented with structural framing material 516, cross-member 502 may be coupled to spacer 506 with one or more right-angle t-slot fasteners. Similarly, spacer 508 may be coupled to cross-member 504 with one or more right-angle t-slot fasteners. FIG. 5D illustrates two structural framing materials 516 coupled together with a straight t-slot fastener 520. As shown in FIG. 5D, t-slot fastener 520 includes one or more drop-in nuts 522. As shown in FIG. 5D drop-in nut 522 has a cross-section that engages with an interior of the t-slot channel 518.

Some vehicles may include an uneven floor either due to the way that a passenger seat stows into the floor or due to other obstructions or irregularities in the design of the floor (e.g., see uneven floor 106 of FIG. 1). However, as mentioned above, some electronic equipment modules (e.g., modules 302A-302C), may be sensitive to their position and/or orientation within the vehicle. Even still some electronic equipment modules may be required to be substantially level with respect to the vehicle. Accordingly, in some aspects, one cross-member of the frame may have a height that is different from the height of the other cross-member to adjust a leveling of the frame and of the corresponding mounting plate. By way of example, FIG. 5E illustrates a cross-member 526 having a height H 532 that is greater than a height H 530 of cross-member 524. In the illustrated example of FIG. 5E, cross-member 526 is implemented as two structural framing materials 516 coupled together by way of straight t-slot fastener 520. Also shown in FIG. 5E is a spacer 528. The example illustrated in FIG. 5E is one possible implementation of frame 500 of FIG. 5A, where cross-member 526 of FIG. 5E corresponds to cross-member 502 of FIG. 5A, cross-member 524 of FIG. 5E corresponds to cross-member 504 of FIG. 5A, and spacer 528 of FIG. 5E corresponds to spacer 506 and/or spacer 508 of FIG. 5A.

Figures 6A, 6B, 6C:
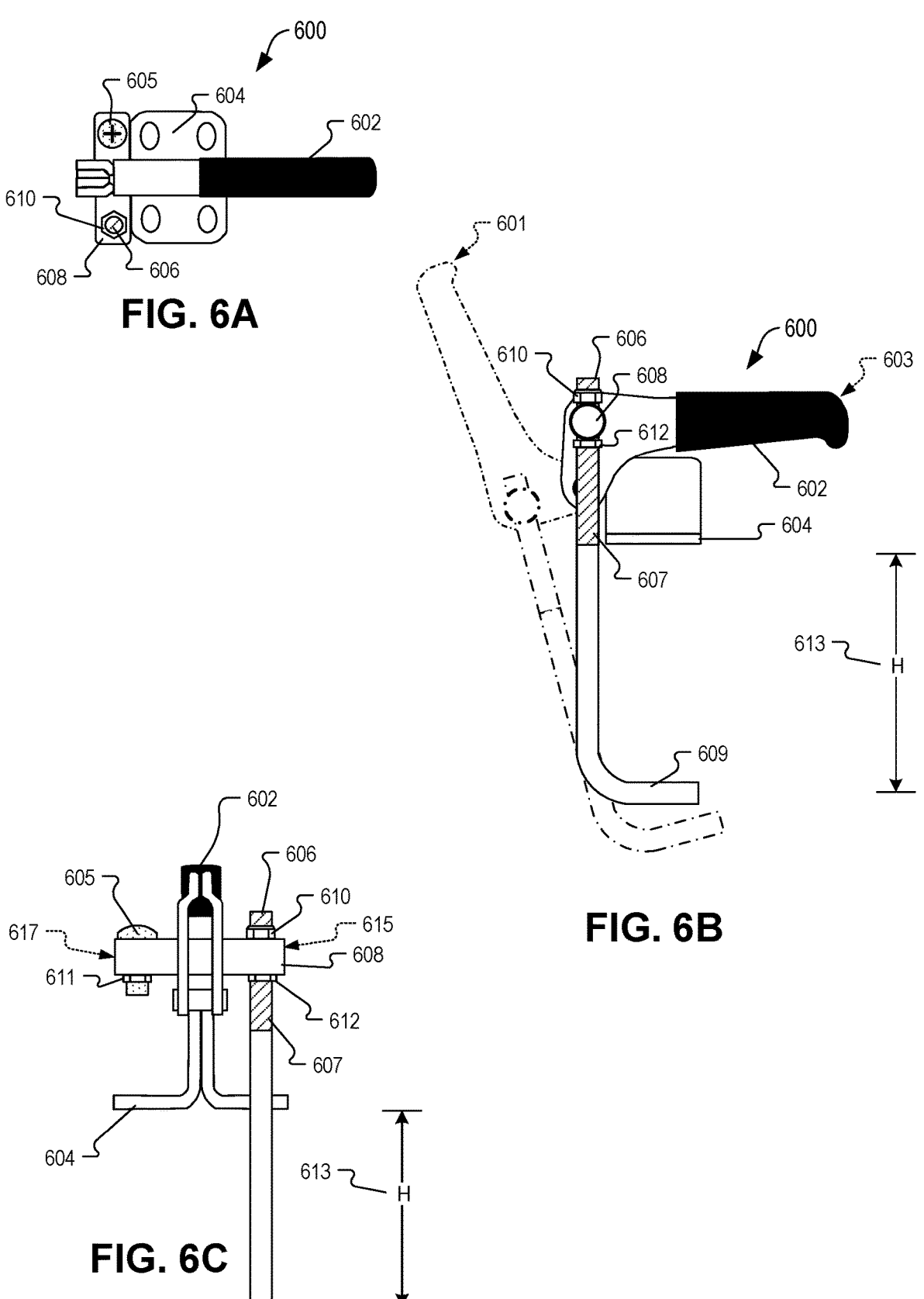
FIGS. 6A-6C illustrate various views of a toggle clamp, in accordance with aspects of the disclosure.

FIGS. 6A-6C illustrate various views of a toggle clamp 600, in accordance with aspects of the disclosure. Toggle clamp 600 is one possible implementation of toggle clamp 306 of FIG. 2 and/or any of the toggle clamps 406A-D of FIG. 4. The illustrated example of toggle clamp 600 is shown as including a control lever 602, a base plate 604, a draw arm 606, a mounting pin 608, a top nut 610, and a bottom nut 612. Toggle clamp 600 is further illustrated as including a retainer bolt 605 and nut 611. Draw arm 606 is shown as including a threaded portion 607 and an engagement portion 609.

As shown in FIG. 6B, control lever 602 is movable between a disengaged position 601 and an engaged position 603. When in the engaged position 603, the control lever 602 tensions the draw arm 606 such that the engagement portion 609 engages with a seat striker of the vehicle (e.g., seat striker 208 of FIG. 2). In the illustrated example, draw arm 606 is coupled to the mounting pin 608 by way of top nut 610 and bottom nut 612 fastened to the threaded portion 607. In some examples, adjustments in the position of the top nut 610 and bottom nut 612 allows for selective adjustments to a height H 613 of draw arm 606. In some aspects, height H 613 refers to a distance from the base plate 604 to the engagement portion 609 of the draw arm 606 to align the draw arm 606 with a corresponding seat striker 208. For example, as mentioned above with reference to FIG. 2, seat striker 208 may be positioned in a recess 209 such that the seat striker 208 is fully recessed, partially recessed, or even fully proud with respect to the floor 206. Thus, the height H 613 of the draw arm 606 is adjustable to obtain correct alignment with the seat striker 208 as well as to obtain sufficient tensioning. In one example, top nut 610 is a lock nut, such as a nylon insert lock nut, to secure draw arm 606 to mounting pin 608 and to prevent loosening due to vibrations that may incur while driving in a vehicle.

As shown in FIG. 6C, mounting pin 608 may be freely positioned through a body of the control lever 602 to allow movements of the draw arm 606. As further shown, the threaded portion 607 of draw arm 606 is secured to a first side 615 of the mounting pin 608 with top nut 610. To further secure the mounting pin 608 to the toggle clamp 600, a retainer bolt 605 and nut 611 may be coupled to a second side 617 of the mounting pin 608. Retainer bolt 605 and nut 611 are configured to secure the mounting pin 608 to prevent it from dislodging due to vibrations and/or when control lever 602 is moved between the disengaged position 601 and engaged position 603.

In some examples, toggle clamp 600 is selectively positionable on a cross-member of a frame. For instance, with reference to FIG. 5A, toggle clamp 600 may be selectively positionable along the entire with W 510 of cross-member 502 to align toggle clamp 600 with a respective seat striker 208 on one side of frame 500. Similarly, toggle clamp 600 may be selectively positionable along the entire width W 512 of cross-member 504 to align toggle clamp 600 with a respective seat striker 208 on the other side of frame 500. In one example implementation, cross-member 502 includes two toggle clamps 600 positioned along the width W 510, whereas cross-member 504 includes another two toggle clamps 600 positioned along with width W 512. In some aspects, the selective positioning of a toggle clamp to a cross-member may be implemented by way of structural framing material and a corresponding fastener. By way of example, FIG. 7 illustrates an example implementation of attaching toggle clamp 600 to a frame, in accordance with aspects of the disclosure. The illustrated example illustrates the base plate 604 of a toggle clamp 600 coupled to the structural framing material 516 by way of a t-slot fastener 700. T-slot fastener 700 is shown as including a drop-in nut 702 and nut 704. As shown in FIG. 7, the drop-in nut 702 is inserted through the base plate 604, into the t-slot channel 518, and secured with nut 704. Thus, in some examples, toggle clamp 600 may be selectively positionable on a cross-member by loosening nut 704 and sliding toggle clamp along the t-slot channel 518 to align the toggle clamp 600 (and draw arm) with a corresponding seat striker 208. In some examples, drop-in nut 702 is a ¼ inch-20 drop-in nut. In another example, toggle clamp 600 is secured to structural framing material 516 with a #8-32 panhead machine screw with a corresponding flat washer and nut located inside the t-slot channel 518.

Referring back to FIG. 6B, in some examples, the engagement portion 609 of draw arm 606 is "L-shaped". The L-shape of engagement portion 609 having an open end allows the engagement portion 609 to be inserted into the closed U-shape of the aforementioned seat strikers 208. In some examples, the engagement portion 609 is at a substantially 90 degree angle with respect to the threaded portion 607 of the draw arm 606. Although FIG. 6B illustrates draw arm 606 as having an L-shaped engagement portion 609, the engagement portion of a draw arm as disclosed herein may include any of a number of shapes to improve alignment and/or engagement with a corresponding seat striker 208.

For example, FIG. 8A illustrates an example draw arm 802A that includes a threaded portion 804 and an engagement portion 806. As shown in FIG. 8A, the engagement portion 806 is "J-shaped". The j-shape of engagement portion 806 may help maintain engagement between the engagement portion 806 and the seat striker 208 and help prevent unintentional slippage and/or disengagement due to vehicle movements or bumps. As shown in the example of FIG. 8A, an axis 807 of the threaded portion 804 is at an angle 808 with respect to an axis 809 of the engagement portion 806. In one example, angle 808 is approximately 90 degrees. In other examples, angle 808 is greater than 90 degrees, such as shown in the example draw arm 802B of FIG. 8B. In some aspects, having an angle 808 greater than 90 degrees may increase the ease with which draw arm 802B is aligned and initially engaged with a respective seat striker 208.

Figure 9A:
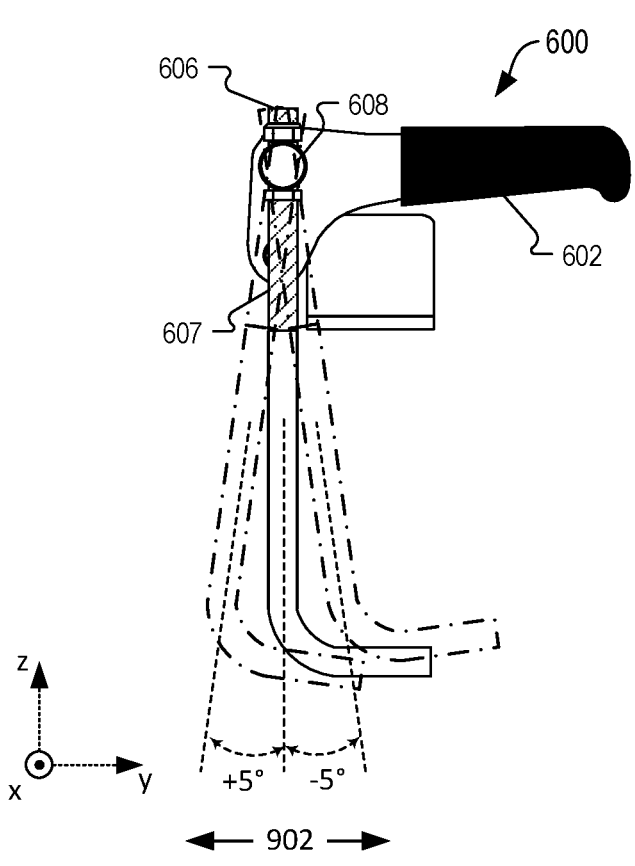
FIGS. 9A and 9B illustrate a draw arm pivotally coupled to a mounting pin of a toggle clamp, in accordance with aspects of the disclosure.
Figure 9B:
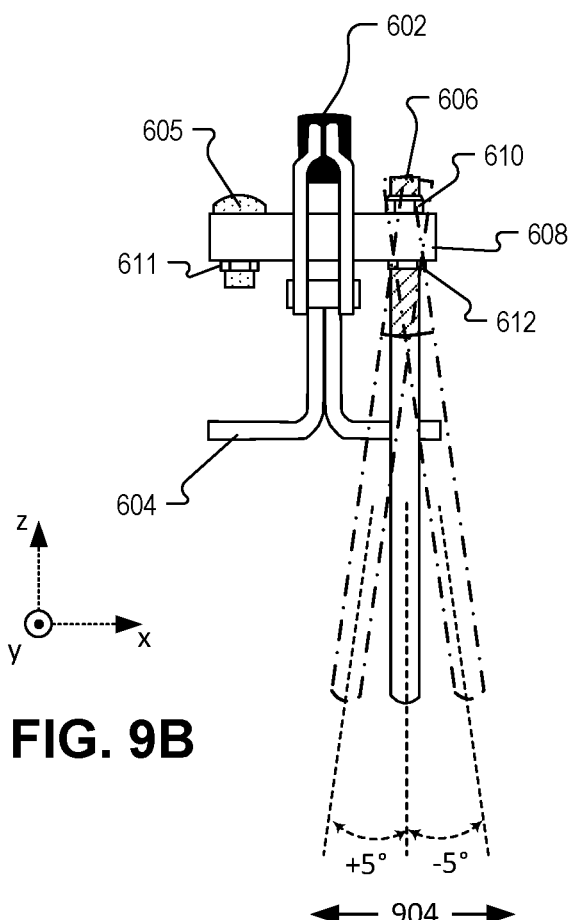

Further optional features to aide in the initial alignment and engagement of a draw arm with a seat striker may be provided by pivotally coupling the draw arm to the toggle clamp. By way of example, FIGS. 9A and 9B illustrate example pivotal attachments of draw arm 606 to mounting pin 608 of toggle clamp 600, in accordance with aspects of the disclosure. In some aspects, mounting pin 608 may include a through-hole through which the threaded portion 607 is inserted and secured via the top nut and bottom nut. In some examples, the through-hole of the mounting pin 608 is oversized. That is, a diameter of the through-hole may be greater than an outer diameter of the threaded portion 607 of the draw arm 606 to allow front-to-back and side-to-side movements of the drawn arm 606 while the control level is in the engaged position. FIG. 9A illustrates the front-to-back movements 902 (e.g., along the y-axis) of the draw arm 606, whereas FIG. 9B illustrates the side-to-side movements 904 (e.g., along the x-axis) of the draw arm 606. The pivotal coupling of the draw arm 606 to the mounting pin 608 that provides these small changes in angle (e.g., plus or minus 5 degrees from center) may further ease engagement of the draw arm 606 during installation due to slight misalignments and/or variances in the positions of the seat strikers 208. In some aspects, draw arm 606 is freely moveable to allow movements 902/904, where the angle at which draw arm 606 is ultimately set at is in response to draw arm 606 being engaged with and tensioned against a seat striker.

Figure 9C:
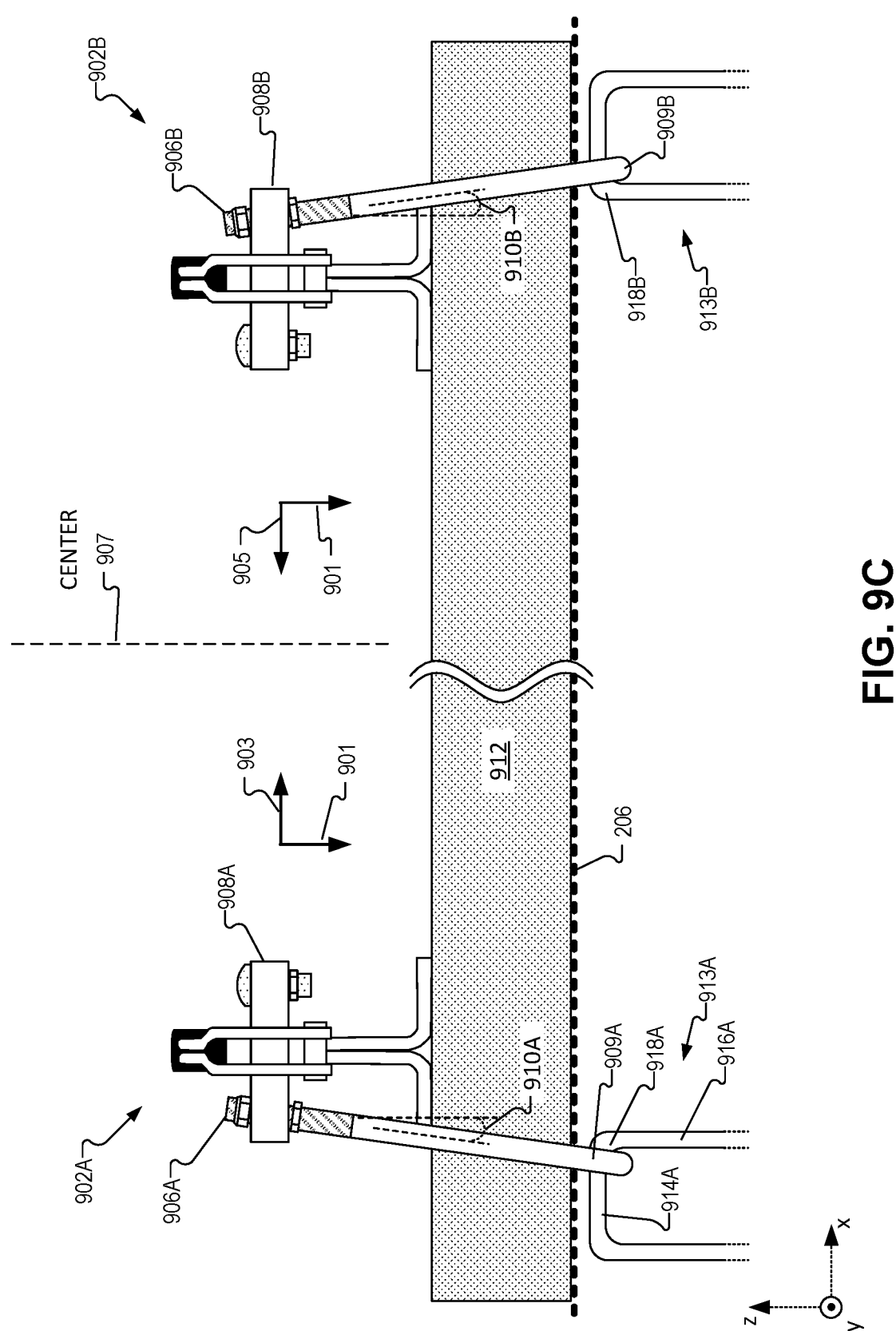
FIG. 9C illustrates an example frame having toggle clamps configured to apply a force in opposite directions to secure the frame from lateral movements, in accordance with aspects of the disclosure.

In addition, the pivotal coupling of the draw arm 606 to the mounting pin 608 may further secure the frame within the vehicle to prevent lateral (e.g., front-to-back and side-to-side) movements of the frame. For example, FIG. 9C illustrates a frame 912 having toggle clamps 902A and 902B configured to apply forces in opposite directions 903/905 to secure frame 912 from lateral movements within the vehicle, in accordance with aspects of the disclosure. Frame 912 is one possible implementation of frame 404 of FIG. 4 and/or frame 500 of FIG. 5A. Frame 912 is shown as including toggle clamp 902A and a toggle clamp 902B. As shown in FIG. 9C, a draw arm 906A is pivotally attached to mounting pin 908A at an angle 910A. In some aspects, angle 910A is a non-zero angle with respect to a straight vertical positioning of the draw arm 906A. For instance, angle 910A may be −5 degrees. Similarly, draw arm 906B is pivotally attached to mounting pin 908B at an angle 910B, where angle 910B is a non-zero angle (e.g., +5 degrees) with respect to a straight vertical positioning of draw arm 906B.

In some examples, the seat strikers with which the draw arms 906A/906B engage with are shaped to include a corner. For instance, seat striker 913A is shown as including a first (e.g., vertical) portion 916A and a second (e.g., horizontal) portion 914A that meet together at a corner 918A. Thus, draw arm 906A may be pivotally coupled to mounting pin 908A at angle 910A such that the engagement portion 909A of the draw arm 906A engages with the corner 918A of the seat striker 913A. When toggle clamp 902A is engaged, the engagement portion 909A of the draw arm 906A is tensioned against the corner 918A of seat striker 913A to secure frame 912 to floor 206 and to prevent lateral movements of frame 912 within the vehicle. For example, as shown in FIG. 9C, toggle clamp 902A is in an engaged position (e.g., see engaged position 603 of FIG. 6B) to provide a force in a downwards direction 901 and a force in a lateral direction 903. Similarly, toggle clamp 902B may be positioned such that the engagement portion 909B of draw arm 906B engages with corner 918B of seat striker 913B when toggle clamp 902B is in the engaged position. As mentioned above, draw arm 906A and drawn arm 906B may be freely rotatable (pivotable) to allow variations in angles 910A/910B. Thus, in some aspects, angle 910A may vary until draw arm 906A is tensioned against corner 918A of seat striker 913A, at which time angle 910A may be set and remain unchanged until toggle clamp 902A is disengaged by the user.

As shown, toggle clamp 902B provides a force in the downwards direction 901 and a force in a lateral direction 905. In some aspects, the force applied by toggle clamp 902A in lateral direction 903 is in the opposite direction 905 as the force applied by toggle clamp 902B. Having the forces applied in opposite lateral directions 903/905 may secure the frame 912 from lateral movements of the frame 912 within the vehicle. Although FIG. 9C illustrates toggle clamps 902A and 902B applying force in opposite directions 903/905 towards a center 907 of the frame 912, in other examples, toggle clamps 902A and 902B may apply respective forces in opposite directions away from the center 907. Even still, although FIG. 9C illustrates toggle clamps 902A and 902B applying forces in opposite directions to secure the frame 912 from lateral movements along the x-axis (e.g., side-to-side), in other examples, the toggle clamps 902A and 902B may also, or in lieu of, be configured to provide forces in opposite directions to secure frame 912 from lateral movements along the y-axis (e.g., front-to-back).

Figure 10:
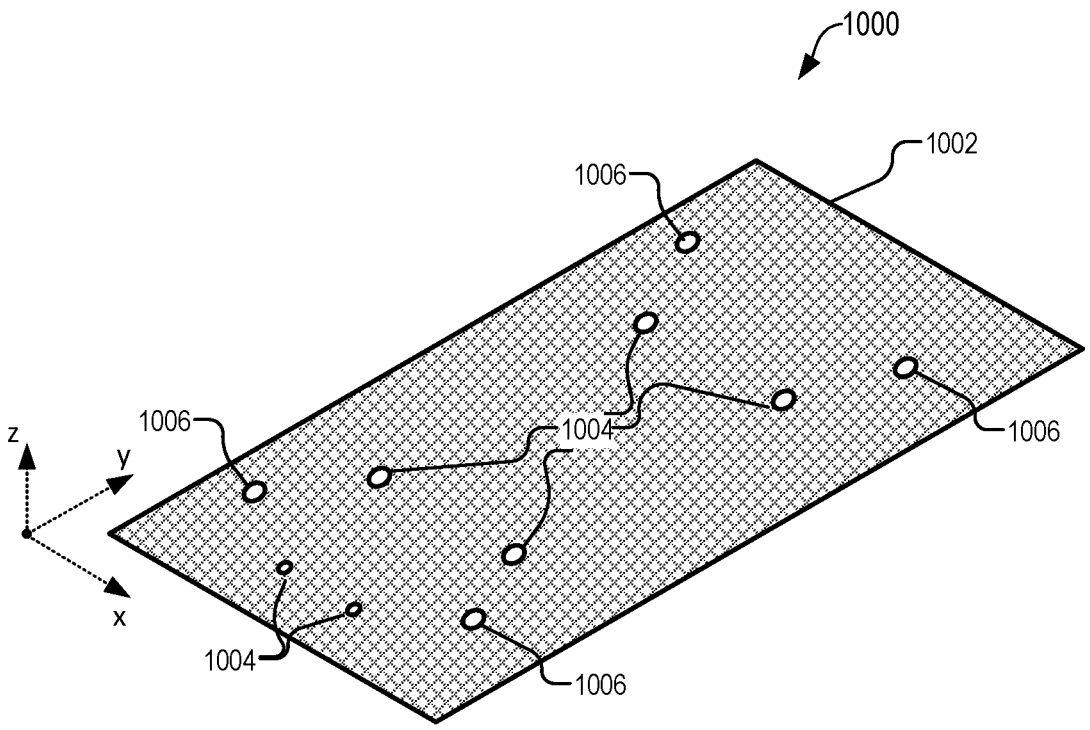
FIG. 10 illustrates an example mounting plate, in accordance with aspects of the disclosure.

FIG. 10 illustrates an example mounting plate 1000, in accordance with aspects of the disclosure. Mounting plate 1000 is one possible implementation of mounting plate 402 of FIG. 4. The illustrated example of mounting plate 1000 is shown as including a plate 1002, mounting features 1004 and mounting features 1006.

In some aspects, plate 1002 is a rigid sheet of material, such as metal (e.g., aluminum), plastic, glass, wood, etc. Although, FIG. 10 illustrates plate 1002 as having a rectangular shape, in other examples plate 1002 may be substantially square. For example, in one implementation, plate 1002 is an 18 inch by 18 inch metal plate having a thickness of ⅛ inch. Mounting features 1004 are configured and located on plate 1002 to secure one or more electronic equipment modules (e.g., 302A-302C of FIG. 4). In some aspects, mounting features 1004 are through-holes, where the electronic equipment modules 302A-302C are secured to the mounting plate 1000 with one or more bolts inserted into through-holes of mounting features 1004. In another example, mounting features 1004 may include threaded holes, adhesive, double-sided tape, or any other fastener for reliably securing the electronic equipment modules 302A-302C to the mounting plate 1000.

As shown in FIG. 10, mounting plate 1000 also includes mounting features 1006 for securing mounting plate 1000 to a frame, such as frame 404 of FIG. 4. Although FIG. 10 illustrates mounting plate 1000 as including four mounting features 1006, mounting plate 1000 may include any number of mounting features 1006, including one or more. In some examples, mounting features 1006 are through holes to allow the mounting plate 1000 to be fastened to the frame (e.g., frame 404). In some aspects, when the frame is implemented using a structural framing material, such as the structural framing material 516 of FIG. 5C, the mounting plate 1000 may be secured to the frame by inserting a t-slot fastener (e.g., t-slot fastener 700 of FIG. 7) through at least one of the through holes of mounting features 1006.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A removable equipment mount for a vehicle, the equipment mount comprising:
    a frame that is to be disposed on a floor of the vehicle, wherein the frame includes:
        a main cross-member configured to extend along a width of an interior of the vehicle; and
        a main toggle clamp coupled to the main cross-member, wherein the main toggle clamp includes a main draw arm positioned to engage with a first seat striker of the vehicle to selectively secure the frame to the floor, and wherein the main draw arm has a threaded portion and an engagement portion, wherein the engagement portion is configured to engage with the first seat striker; and
    a mounting plate coupled to the frame, wherein the mounting plate includes one or more mounting features configured to secure an electronic equipment module to the mounting plate.

2. The equipment mount of claim 1, wherein the frame further comprises:
    a second cross-member configured to extend along another width of the interior of the vehicle;
    a spacer coupled to the main cross-member and to the second cross-member to space the main cross-member apart from the second cross-member; and
    a second toggle clamp coupled to the second cross-member, wherein the second toggle clamp includes a second draw arm positioned to engage with a second seat striker of the vehicle, wherein the spacer has a length configured to align the main draw arm with the first seat striker and to align the second draw arm with the second seat striker.

3. The equipment mount of claim 2, wherein the floor of the vehicle is uneven and wherein the first cross-member has a height that is different from a height of the second cross-member to adjust a leveling of the mounting plate.

4. The equipment mount of claim 1, wherein the main toggle clamp is selectively positionable on the main cross-member along the width of the interior of the vehicle to align the main draw arm with the first seat striker.

5. The equipment mount of claim 4, wherein the first cross-member comprises a structural framing material have a channel that extends along a width of the first cross-member.

6. The equipment mount of claim 5, wherein the channel of the structural framing material comprises a t-slot channel and wherein the main toggle clamp is secured to the structural framing material with a t-slot fastener.

7. The equipment mount of claim 1, wherein the threaded portion of the main draw arm is configured to allow selective adjustments to a height of the main draw arm to align the main draw arm with the first seat striker.

8. The equipment mount of claim 1, wherein the engagement portion of the main draw arm is L-shaped.

9. The equipment mount of claim 1, wherein the engagement portion of the main draw arm is J-shaped.

10. The equipment mount of claim 1, wherein the engagement portion of the main draw arm has an axis that is at an angle greater than 90 degrees with respect to an axis of the threaded portion.

11. The equipment mount of claim 1, wherein the frame includes a second toggle clamp having a second draw arm positioned to engage with a second seat striker of the vehicle, wherein the main toggle clamp is configured to apply a force in a first direction when engaged and the second toggle clamp is configured to apply a second force in a second direction when engaged, wherein the first direction is opposite the second direction to secure the frame from lateral movements within the vehicle.

12. The equipment mount of claim 11, wherein the main draw arm is pivotally coupled to a mounting pin of the main draw arm to allow front-to-back and side-to-side movements of the main drawn arm.

13. The equipment mount of claim 12, wherein the main draw arm is pivotally coupled to the mounting pin at an angle to engage with a corner of the first seat striker and to provide the first force in the first direction.

14. The equipment mount of claim 1, wherein the main draw arm includes a mounting pin, wherein the threaded portion of the main draw arm is secured to a first side of the mounting pin with a locking nut, and wherein the main toggle clamp includes a retainer bolt coupled to a second side of the mounting pin to secure the mounting pin to the main toggle clamp.

15. A removable equipment system for a vehicle, the equipment system comprising:
    an electronic equipment module, wherein the electronic equipment module comprises an inertial navigation system (INS);
    a frame that is to be disposed on the floor of the vehicle, wherein the frame includes:
        a main cross-member configured to extend along a width of an interior of the vehicle; and
        a main toggle clamp coupled to the main cross-member, wherein the main toggle clamp includes a main draw arm positioned to engage with a first seat striker of the vehicle to selectively secure the frame to the floor; and
    a mounting plate coupled to the frame, wherein the electronic equipment module is disposed on and mounted to the mounting plate.

16. The equipment system of claim 15, wherein the main toggle clamp is selectively positionable on the main cross-member along the width of the interior of the vehicle to align the main draw arm with the first seat striker.

17. A vehicle equipment platform, comprising:
a vehicle having an interior floor that includes a plurality of seat strikers that are configured to secure at least one passenger seat to the floor;
a removable equipment system selectively secured to the floor of the vehicle, wherein the equipment system includes:
a frame disposed on the floor of the vehicle, wherein the frame includes:
a main cross-member that extends along a width of the interior of the vehicle; and
a main toggle clamp coupled to the main cross-member, wherein the main toggle clamp includes a main draw arm positioned to engage with a first seat striker of plurality of seat strikers to selectively secure the frame to the floor, wherein the main toggle clamp is selectively positionable on the main cross-member along the width of the interior of the vehicle to align the main draw arm with the first seat striker;
a second cross-member that extends along the width of the interior of the vehicle;
a spacer coupled to the main cross-member and to the second cross-member to space the main cross-member apart from the second cross-member;

a second toggle clamp coupled to the second cross-member, wherein the second toggle clamp includes a second draw arm positioned to engage with a second seat striker of the plurality of seat strikers, wherein the spacer has a length configured to align the main draw arm with the first seat striker and to align the second draw arm with the second seat striker, and wherein the second toggle clamp is selectively positionable on the second cross-member along the width of the interior of the vehicle to align the second draw arm with the second seat striker;
a mounting plate coupled to the frame; and
an electronic equipment module disposed on and mounted to the mounting plate, wherein the first cross-member, the second cross-member, and the spacer, each comprise a structural framing material have a t-slot channel.

18. The vehicle equipment platform of claim 17, wherein the main draw arm has a threaded portion and an engagement portion, wherein the engagement portion of the main draw arm is L-shaped or J-shaped.

* * * * *